United States Patent
Henderson et al.

(10) Patent No.: US 6,900,834 B2
(45) Date of Patent: May 31, 2005

(54) METHOD OF DETECTING FLICKER, AND VIDEO CAMERA USING THE METHOD

(75) Inventors: Robert Henderson, Edinburgh (GB); Stewart Gresty Smith, Edinburgh (GB); Jonathan Ephriam David Hurwitz, Edinburgh (GB); Andrew Murray, Edinburgh (GB)

(73) Assignee: STMicroelectronics Limited, Buckinghamshire (GB)

( * ) Notice: Subject to any disclaimer, the term of this patent is extended or adjusted under 35 U.S.C. 154(b) by 595 days.

(21) Appl. No.: 09/939,517

(22) Filed: Aug. 24, 2001

(65) Prior Publication Data

US 2002/0097328 A1 Jul. 25, 2002

(30) Foreign Application Priority Data

Aug. 25, 2000 (GB) .............................................. 0020857

(51) Int. Cl.[7] .................................................. H04N 9/73
(52) U.S. Cl. ...................... 348/226.1; 348/447; 348/910
(58) Field of Search ............................. 348/226.1, 241, 348/362, 252, 221.1, 607, 447, 229.1, 910

(56) References Cited

U.S. PATENT DOCUMENTS

| | | | | |
|---|---|---|---|---|
| 4,879,591 A | * | 11/1989 | Takei | 348/227.1 |
| 4,992,855 A | * | 2/1991 | Takei | 348/226.1 |
| 5,065,248 A | | 11/1991 | Homma | 358/228 |
| 5,272,539 A | | 12/1993 | Kondo | 358/228 |
| 5,701,526 A | | 12/1997 | Iwasaki | 396/234 |
| 6,295,085 B1 | * | 9/2001 | Munson et al. | 348/226.1 |
| 6,630,953 B1 | * | 10/2003 | Toyoda et al. | 348/226.1 |
| 6,646,680 B1 | * | 11/2003 | Mead et al. | 348/230.1 |

FOREIGN PATENT DOCUMENTS

| | | | | |
|---|---|---|---|---|
| EP | 0660598 | 6/1995 | .......... | H04N/5/235 |
| JP | 1227582 | 9/1989 | .......... | H04N/5/238 |

OTHER PUBLICATIONS

Patent Abstracts of Japan, vol. 014, no. 374 (E–0964), Aug. 13, 1990 & JP02135986A (Nec Corp.), May 24, 1990.

* cited by examiner

*Primary Examiner*—Aung Moe
(74) *Attorney, Agent, or Firm*—Lisa K. Jorgenson; Allen, Dyer, Doppelt, Milbrath & Gilchrist, P.A.

(57) ABSTRACT

Lighting flicker in the output of a video imaging device is detected. The video imaging device has a main picture area divided into pixels for producing successive images at a frame rate. A series of signals are produced from at least one additional picture area adjacent the main picture area, with the additional picture area having a size substantially larger than a pixel. Each of the signals is a function of light incident on the additional picture area in a time period substantially shorter than that of the frame rate. A predetermined number of the signals are accumulated to form a series of compound samples, and the compound samples are filtered to detect components indicating the lighting flicker. The filtering is performed using a bandpass filter tuned to the nominal flicker frequency. The compound samples are formed at a sample rate which is a multiple of the nominal flicker frequency, and the filtering is performed by taking the fundamental output component of a radix-N butterfly.

38 Claims, 2 Drawing Sheets

METHOD OF DETECTING FLICKER, AND VIDEO CAMERA USING THE METHOD

FIELD OF THE INVENTION

The present invention relates to a method of detecting lighting induced flicker in a video signal, and to a video camera equipped for carrying out this method.

BACKGROUND OF THE INVENTION

Artificial lighting derived from alternating current sources, particularly fluorescent lighting, contains a strong brightness modulation component, or flicker, at twice the frequency of the alternating current sources. This factor of 2 arises from the power relation between instantaneous voltage of the alternating current sources and instantaneous brightness, and from the trigonometric relation $\cos^2(x)=0.5(1+\cos(2x))$. Commonly encountered flicker frequencies are 100 Hz in Europe and 120 Hz in the United States. Although invisible to the human eye, flicker may be highly visible to image sensors. The problem is most apparent at low exposure values. An imagine sensor samples this modulation waveform as reflected from objects in the scene and reproduces it perfectly.

Solid-state sensors fall into two broad categories according to exposure method. One category is full-field, where all pixel elements of the sensor are exposed simultaneously. A second category is rolling window, where all pixel elements in a sensor row are exposed simultaneously, but the onset of exposure is delayed from row to row. Lighting flicker induces a periodic variation in luminance, known as banding. Banding is apparent in the time domain, and in the case of rolling-window sensors banding is also apparent in the vertical spatial domain.

In the case of the rolling-window sensors, should the camera and the frequency of the alternating current source be in perfect synchronization, the modulation pattern will be temporally frozen, appearing as static luminance banding down the image. However, the problem is compounded if camera field rates and frequency of the alternating current source differs by some amount, causing the luminance modulation bands to roll up or down the image. The rate of roll depends mostly on whether the camera is operating home or away, i.e., nominal frame rate may be a close sub-multiple of the frequency of the alternating current source. For example, a 50 Hz camera operating in the United States is operating away. Roll associated with a camera operating at home is extremely slow, while roll associated with a camera operating away is much faster.

As well as being visibly distracting to the viewer, luminance modulation generates considerable frame-to-frame differences in image streams which could, for example, make the difference between a software video CODEC performing acceptably. Thus, it is important that a camera system be capable of detecting and cancelling artificial lighting flicker.

Detection of lighting flicker in the spatial domain is difficult in the case of rolling-window exposure sensors, and is much more difficult in the case of full-field exposure sensors. In the former case the difficulty is due to potential strong correlations between expected banding patterns caused by lighting flicker and variations in actual scene luminance.

U.S. Pat. No. 5,053,871 discloses a still video camera which uses a previewing technique to provide automatic exposure control and flicker detection. However, there is a need to provide flicker detection in motion video cameras. U.S. Pat. No. 5,272,539 discloses a video camera with flicker detection, but in this prior arrangement the detector frame rate is coupled with the video frame rate, which limits its usefulness.

SUMMARY OF THE INVENTION

An object of the present invention is to provide a time-domain technique for detecting and reducing the frequency of flicker for motion video cameras, and which is also capable of being applied to both full-field exposure sensors and rolling-window exposure sensors.

This and other objects, advantages and features of the present invention are provided by a method for detecting lighting flicker in an output of a video imaging device having a main picture area comprising an array of pixels for producing successive images at a frame rate. The method preferably comprises producing a series of signals from at least one additional picture area adjacent the main picture area. The at least one additional picture area has a size substantially larger than a pixel, with each signal being a function of light incident on the at least one additional picture area in a time period substantially shorter than the frame rate. A predetermined number of the series of signals are accumulated to form a series of compound samples, and the series of compound samples are filtered to detect components indicating the flicker.

The time period may be equivalent to a line rate of the main picture area. The filtering may be performed by a bandpass filter tuned to a frequency of the flicker. Each compound sample may be formed at a sample rate which is a multiple of a nominal flicker frequency, and wherein the filtering comprises taking a fundamental output component of a radix-N butterfly. The method preferably further includes selecting an exposure setting for the main picture area for reducing the flicker.

Another aspect of the present invention relates to a flicker-detecting video camera comprising a main picture area comprising an array of pixels for producing successive images at a frame rate, and at least one additional picture area adjacent the main picture area. The at least one additional picture area may have a size substantially larger than a pixel, and the at least one additional picture area may be arranged for producing a series of signals each of which is a function of light incident on the at least one additional picture area in a time period substantially shorter than that of the frame rate.

The video camera preferably further includes an accumulator circuit for accumulating a predetermined number of the series of signals to form a series of compound samples, and a filter for filtering the series of compound samples for detecting components indicating the flicker.

The at least one additional picture area may be defined by a strip of pixels down one side of the array. In one embodiment, the strip of pixels is a column of pixels of the array, with each pixel in the column being connected together.

The video camera may further comprise an automatic exposure control circuit, and a second exposure control circuit for setting an exposure period which is an inverse of a frequency of the flicker or a harmonic thereof, and a control circuit for selectively connecting the automatic exposure control circuit and the second exposure control circuit to the main picture area for controlling exposure thereof based upon an output of the filter.

BRIEF DESCRIPTION OF THE DRAWINGS

An embodiment of the invention will now be described, by way of example only, with reference to the drawings, in which.

DETAILED DESCRIPTION OF THE PREFERRED EMBODIMENTS

Figure 1:
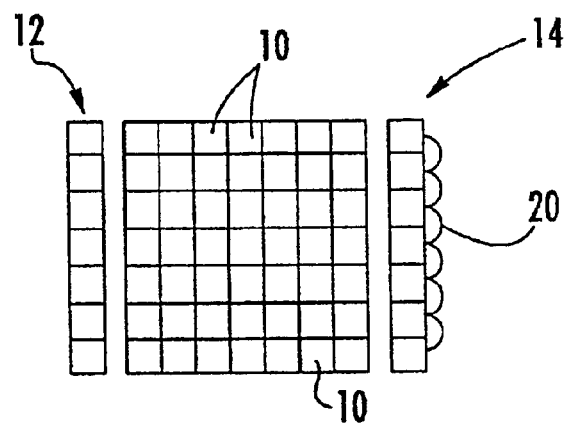
FIG. 1 is a schematic representation of a photosensitive array according to one embodiment of the present invention.

Referring to FIG. 1, a photosensitive array comprises a main array of pixels 10. It will be appreciated that FIG. 1 is highly schematic, with only a small number of pixels 10 being shown. Additionally, the photosensitive array comprises one or more (in this embodiment, two) super-pixels 12 and 14. Each of the super-pixels 12, 14 differ from the pixels 10 of the main array in two principal ways.

The super-pixels 12, 14 are physically large in comparison to the pixels 10 of the main array so that they may stand a better chance of imaging some part of the scene which contains a flickering light source or reflects such a flickering source. In this example, each super-pixel is one entire column of photosensitive pixel elements 10 which have been electrically connected in common.

The super-pixels 12, 14 are exposed and sensed in a manner independent from the pixels 10 of the main array. While each line of the main array is sensed at the frame rate dictated by each application, each super-pixel 12, 14 is sensed independently, usually at a rate much higher than the sensor frame rate to produce a suitable sequence of readings in each period of the lighting flicker. A convenient rate at which to sense each super-pixel 12, 14 is the line-rate of the application, which is usually some hundreds of times faster than the frame-rate.

Separate means should be provided to control the gain of each super-pixel 12, 14 to ensure its output sample falls within its linear operating range while maximizing dynamic range. As stated above, each super-pixel 12, 14 may be provided by connecting in common a column of standard size pixels, as indicated by interconnection line 20 in FIG. 1.

Figure 2:
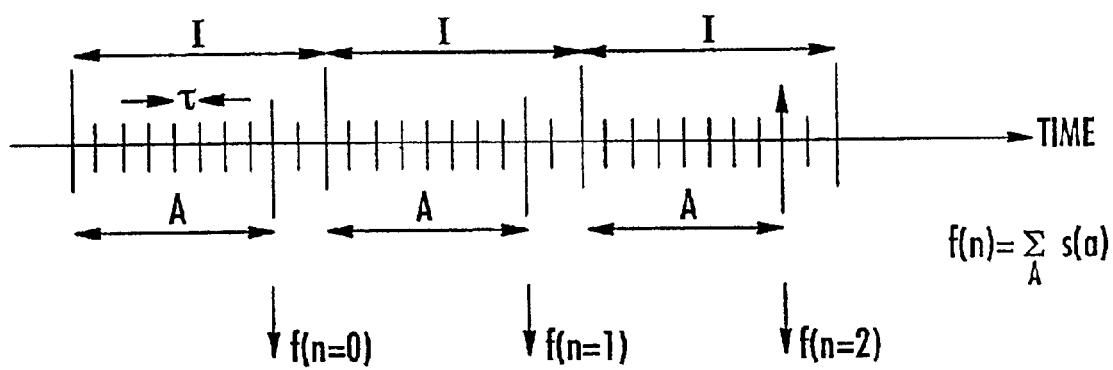
FIG. 2 illustrates a sampling method according to the present invention.
Figure 3:
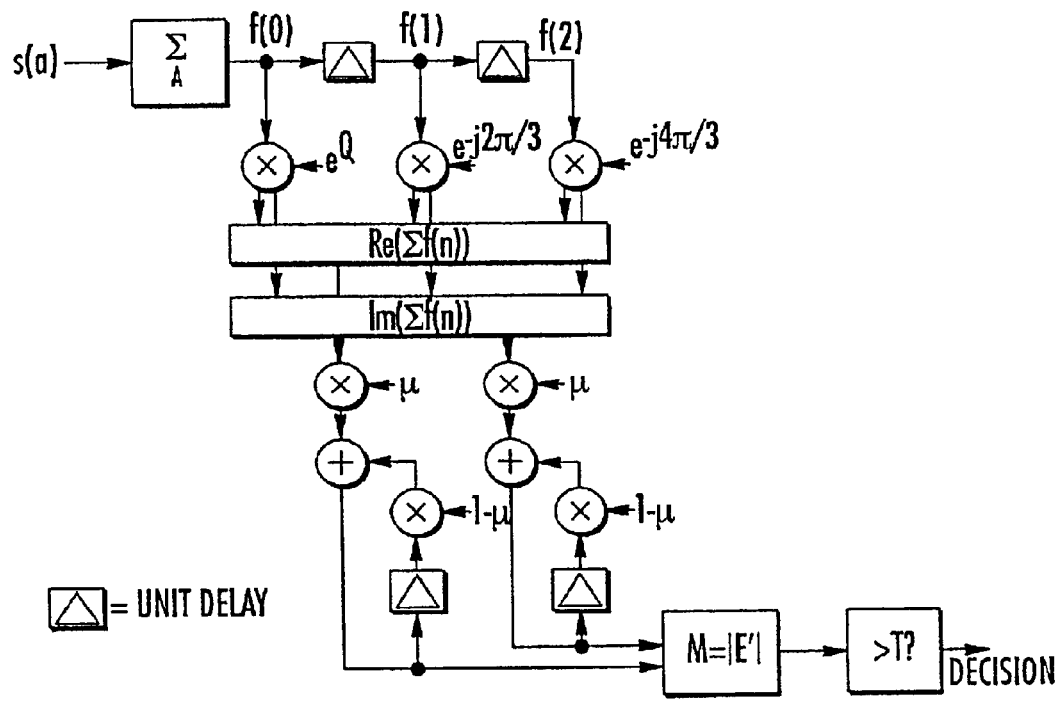
FIG. 3 is a block diagram of the flicker detection method according to the present invention.

The output of each super-pixel 12, 14 is then operated on by a detection mechanism which will now be described with reference to FIGS. 2 and 3. The following description refers to the use of a single super-pixel. The detection mechanism operates an infinitum on successive length-N sequences f(n) of compound samples. Each compound sample comprises one or more accumulated individual samples s(a) of the super-pixel. Each compound sample is spaced apart by an appropriate interval I, with the interval I being referred to as the compound sampling interval.

The individual super-pixel samples s(a) are accumulated over a fixed number of lines A, less than or equal to the interval I, and is referred to as the compound sampling aperture. Such accumulation allows an ensemble reduction of random components contained in each super-pixel reading s(a) at the expense of amplitude reduction of the super-pixel signal at the frequencies of interest. This is attributable to the roll-off effect of a sampling aperture:

$$f(n) = \frac{1}{A}\sum_{a=1}^{A} s(a)$$

Note that in the cases where the desired compound sampling interval I cannot be expressed as an integer multiple of the sensor line interval, the compound sampling interval can be adjusted on an instantaneous basis to average out to the desired interval over time. The resultant phase jitter is tolerable as long as the compound sampling aperture remains constant. FIG. 2 illustrates the composition of the sequence f(n) for N=3.

One example of a detection mechanism takes the form of a bandpass filter tuned to the nominal frequency of the flicker. If the compound sample rate of the super-pixel is chosen as a multiple of the nominal flicker frequency, a straightforward detector might use the fundamental output component F(1) of a radix-N butterfly, or N-rotor. This circuit performs complex correlations with the fundamental Nth-root of unity to produce the instantaneous measure of complex flicker energy E:

$$E = F(1) = \sum_{n=0}^{N-1} f(n)e^{-2\pi \frac{n}{N}}$$

While radix-2 is the simplest butterfly, its response is phase-dependent and therefore unreliable. As N increases, so does hardware complexity, and the smaller the compound sampling interval and potential aperture. We have found that N=3 or 4 yields the most efficient and effective results.

These instantaneous complex flicker energy readings E should be averaged over time in some manner to produce a longer term estimate E' of flicker energy. One example of an averaging mechanism is the first-order autoregressive filter, or leaky integrator, whose ability to track phase drift may be traded against noise immunity by its system time constant $\mu$, and updating long term average E' with an instantaneous measure E:

$$E'=E\mu+E'(1-\mu)$$

The process of magnitude extraction affords some protection against phase drift, an inevitable consequence of short term or long term differences between actual and nominal flicker frequencies. The final flicker detection decision should be based on the magnitude or modulus of long term average E'. For example, if T is some programmable or predefined threshold, then the Boolean decision variable d can be defined as follows:

$$d=|E'|>T$$

Note that the compound sampling interval may be chosen to undersample the flicker signal, relying on the folding or aliasing effect to detect harmonics of a notional subharmonic of flicker. While this method allows longer exposure times or compound sampling apertures, it is less able to track flicker frequencies differing from the nominal. This is so since the error in an instantaneous angular frequency is greater than that of the fundamental case for a given difference between actual and nominal flicker frequencies.

Figure 4:
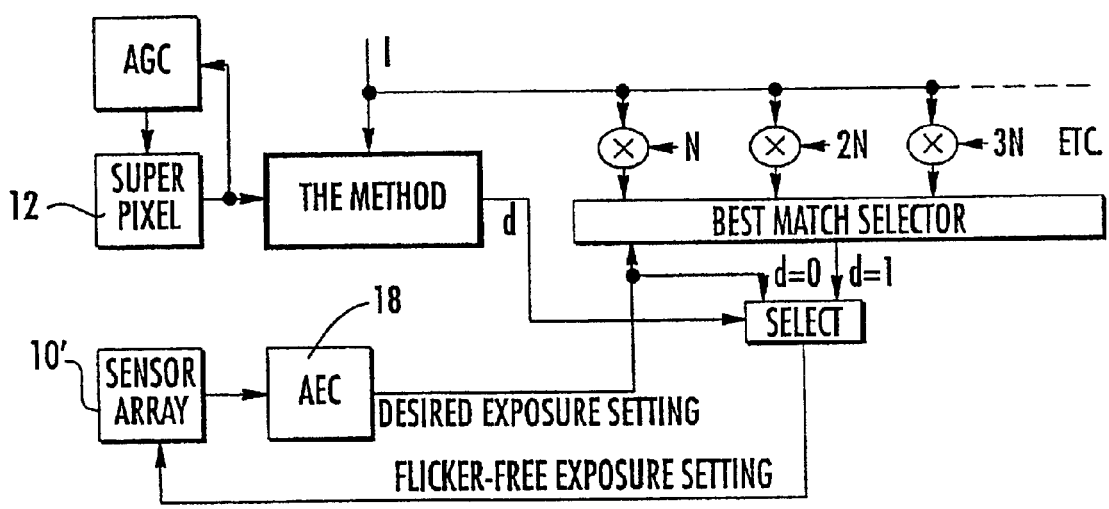
FIG. 4 is a block diagram showing use of the method according to the present invention in a video camera.

FIG. 4 shows the foregoing method used in a flicker detecting video camera. The main sensor array 10' has its exposure setting controlled by either the output of an automatic exposure control circuit 18 of a known type, or by a flicker free exposure setting. The choice between these two is controlled by the Boolean operator and as derived above.

The actual correction of lighting flicker, once detected and identified in frequency, is relatively straightforward. To expand on the sampling analogy, it is well known that increasing a sampling aperture away from the therotical perfect sampling (i.e., convolution with a dirac-delta pulse train) causes a roll-off of the frequency response which obeys the equally well known sin(x)/x or sinc function. If the exposure window is considered as a sampling aperture, then those temporal frequencies present in the scene whose period coincides with the temporal duration of the exposure window, or harmonics of such frequencies, will be rendered invisible, as they coincide with nulls in the sinc function. Setting the exposure period to the inverse of a suspected flicker frequency or one of its harmonics will then provide effective banding removal.

A weakness of this scheme can arise under bright lighting conditions. Here the sinc function approaches the origin and no sinc function null can be found which corresponds to a desirable exposure setting. Without recourse to additional exposure control mechanisms such as LCD shutter or mechanical iris, a compromise should be sought between acceptable banding and acceptable exposure setting. The invention thus provides a technique for detection and frequency identification of flicker which operates in the time domain, and which is applicable to both full-field exposure sensors and to rolling-window exposure sensors.

Modifications and improvements may be made to the foregoing embodiment within the scope of the invention.

That which is claimed is:

1. A method for detecting lighting flicker in an output of a video imaging device having a main picture area comprising an array of pixels for producing successive images at a frame rate, the method comprising:
   producing a series of signals from at least one additional picture area adjacent the main picture area, the at least one additional picture area having a size substantially larger than a pixel, with each signal being a function of light incident on the at least one additional picture area in a time period substantially shorter than the frame rate;
   accumulating a predetermined number of the series of signals to form a series of compound samples; and
   filtering the series of compound samples to detect components indicating the lighting flicker.

2. A method according to claim 1, wherein the time period is equivalent to a line rate of the main picture area.

3. A method according to claim 1, wherein the at least one additional picture area comprises a plurality of additional picture areas.

4. A method according to claim 1, wherein the filtering is performed by a bandpass filter tuned to a frequency of the lighting flicker.

5. A method according to claim 1, wherein each compound sample is formed at a sample rate which is a multiple of a nominal lighting flicker frequency; and wherein the filtering comprises taking a fundamental output component of a radix-N butterfly.

6. A method according to claim 5, wherein N is equal to at least one of 3 and 4.

7. A method according to claim 5, wherein the fundamental output component represents an instantaneous complex lighting flicker energy E, with E being averaged over time to produce a longer term estimate E' of a lighting flicker energy.

8. A method according to claim 7, wherein the longer term estimate E' of the lighting flicker energy is produced according to $$E'=E\mu+E'(1-\mu)$$

where $\mu$ is a time constant.

9. A method according claim 7, further comprising:
   deriving a modulus of E'; and
   comparing the derived modulus to a threshold T to give a final estimation of the lighting flicker being present if $|E'|>T$.

10. A method according claim 1, further comprising selecting an exposure setting for the main picture area for reducing the lighting flicker.

11. A method for reducing lighting flicker in an output of a video imaging device having a main picture area comprising an array of pixels for producing successive images at a frame rate, the method comprising:
   detecting the lighting flicker in the output of the video imaging device, the detecting comprising
      producing a series of signals from at least one additional picture area adjacent the main picture area, the at least one additional picture area having a size substantially larger than a pixel, with each signal being a function of light incident on the at least one additional picture area in a time period substantially shorter than that of the frame rate,
      accumulating a predetermined number of the series of signals to form a series of compound samples, and
      filtering the series of compound samples to detect components indicating the lighting flicker; and
   selecting an exposure setting for the main picture area for reducing the lighting flicker.

12. A method according to claim 11, wherein selecting the exposure setting comprises selecting an exposure period which is an inverse of a frequency of the lighting flicker.

13. A method according to claim 12, wherein the frequency of the lighting flicker includes a harmonic thereof.

14. A method according to claim 11, wherein the time period is equivalent to a line rate of the main picture area.

15. A method according to claim 11, wherein the at least one additional picture area comprises a plurality of additional picture areas.

16. A method according to claim 11, wherein the filtering is performed by a bandpass filter tuned to a frequency of the lighting flicker.

17. A method according to claim 11, wherein each compound sample is formed at a sample rate which is a multiple of a nominal lighting flicker frequency; and wherein the filtering comprises taking a fundamental output component of a radix-N butterfly.

18. A method according to claim 17, wherein N is equal to at least one of 3 and 4.

19. A method according to claim 17, wherein the fundamental output component represents an instantaneous complex lighting flicker energy E, with E being averaged over time to produce a longer term estimate E' of a lighting flicker energy.

20. A method according to claim 19, wherein the longer term estimate E' of the lighting flicker energy is produced according to $$E'=E\mu+E'(1-\mu)$$

where $\mu$ is a time constant.

21. A method according claim 19, further comprising:
   deriving a modulus of E'; and
   comparing the derived modulus to a threshold T to give a final estimation of the lighting flicker being present if $|E'|>T$.

22. A method according claim 11, further comprising selecting an exposure setting for the main picture area for reducing the lighting flicker.

23. A lighting flicker-detecting video camera comprising:
a main picture area comprising an array of pixels for producing successive images at a frame rate;
at least one additional picture area adjacent said main picture area and having a size substantially larger than a pixel, said at least one additional picture area being arranged for producing a series of signals each of which is a function of light incident on said at least one additional picture area in a time period substantially shorter than that of the frame rate;
accumulator means for accumulating a predetermined number of the series of signals to form a series of compound samples; and
filter means for filtering the series of compound samples for detecting components indicating the lighting flicker.

24. A video camera according to claim 23, wherein said at least one additional picture area is defined by a strip of pixels down one side of said array.

25. A video camera according to claim 24, wherein the strip of pixels is a column of pixels of said array, with each pixel in the column being connected together.

26. A video camera according to claim 23, further comprising:
main gain control means for said main picture area; and
additional gain control means for said at least one additional picture area that is independent of said main gain control means.

27. A video camera according to claim 23, wherein said filter means comprises a radix-N butterfly.

28. A video camera according to claim 27, further comprising an averaging circuit connected to an output of the radix-N butterfly.

29. A video camera according to claim 28, wherein said averaging circuit comprises a first-order auto-regressive filter.

30. A video camera according to claim 23, further comprising:
an automatic exposure control circuit;
a second exposure control circuit for setting an exposure period which is an inverse of a frequency of the lighting flicker or a harmonic thereof; and
control means for selectively connecting said automatic exposure control circuit and said second exposure control circuit to said main picture area for controlling exposure thereof based upon an output of said filter means.

31. A video camera comprising:
a main picture area comprising an array of pixels for producing successive images at a frame rate;
at least one additional picture area adjacent said main picture area and having a size substantially larger than a pixel, said at least one additional picture area being arranged for producing a series of signals each of which is a function of light incident on said at least one additional picture area in a time period substantially shorter than that of the frame rate;
an accumulator circuit for accumulating a predetermined number of the series of signals to form a series of compound samples; and
a filter for filtering the series of compound samples for detecting components indicating the lighting flicker.

32. A video camera according to claim 31, wherein said at least one additional picture area is defined by a strip of pixels down one side of said array.

33. A video camera according to claim 32, wherein the strip of pixels is a column of pixels of said array, with each pixel in the column being connected together.

34. A video camera according to claim 31, further comprising:
a main gain control circuit for said main picture area; and
an additional gain control circuit for said at least one additional picture area that is independent of said main gain control circuit.

35. A video camera according to claim 31, wherein said filter comprises a radix-N butterfly.

36. A video camera according to claim 35, further comprising an averaging circuit connected to an output of the radix-N butterfly.

37. A video camera according to claim 36, wherein said averaging circuit comprises a first-order auto-regressive filter.

38. A video camera according to claim 31, further comprising:
an automatic exposure control circuit;
a second exposure control circuit for setting an exposure period which is an inverse of a frequency of the lighting flicker or a harmonic thereof; and
a control circuit for selectively connecting said automatic exposure control circuit and said second exposure control circuit to said main picture area for controlling exposure thereof based upon an output of said filter.

* * * * *